United States Patent [19]

Suzuki, deceased et al.

[11] Patent Number: 4,636,898
[45] Date of Patent: Jan. 13, 1987

[54] MULTICHANNEL MAGNETIC HEAD

[75] Inventors: Masaki Suzuki, deceased, late of Kanagawa, Japan, by Yumiko Suzuki, legal representative; Goro Akashi, Kanagawa, Japan

[73] Assignee: Fuji Photo Film Co., Ltd., Kanagawa, Japan

[21] Appl. No.: 756,616

[22] Filed: Jul. 19, 1985

[51] Int. Cl.⁴ .................................. G11B 5/22
[52] U.S. Cl. .................................. 360/122
[58] Field of Search .......................... 360/122

[56] References Cited

FOREIGN PATENT DOCUMENTS 0200922  12/1982  Japan ................................. 360/122
0213013  12/1984  Japan ................................. 360/122

OTHER PUBLICATIONS

Legros, "Magnetic Head", IBM Tech Disc Bull., vol. 23, No. 7A, Dec. 1980, p. 2845.
Hehl et al., "Spherical . . . Design", IBM Tech Disc Bull., vol. 20, No. 8, Jan. 1978, p. 3185.

Primary Examiner—Robert S. Tupper
Attorney, Agent, or Firm—Sughrue, Mion, Zinn, Macpeak & Seas

[57] ABSTRACT

A multichannel magnetic recording/reproducing head for which the amount of waving of the tape is significantly reduced and contamination of the recording/reproducing gaps of the head by dust or the like is substantially eliminated. A plurality of parallel grooves are formed on a tape-contact surface of the head, inclined with respect to a running direction of the magnetic tape and provided at least at a tape-entrance side of the surface. The inclination of the grooves is within an angular range of 1 to 30 degrees with respect to the tape running direction, and the depth of the grooves is within a range of 0.1 to 20 microns.

9 Claims, 13 Drawing Figures

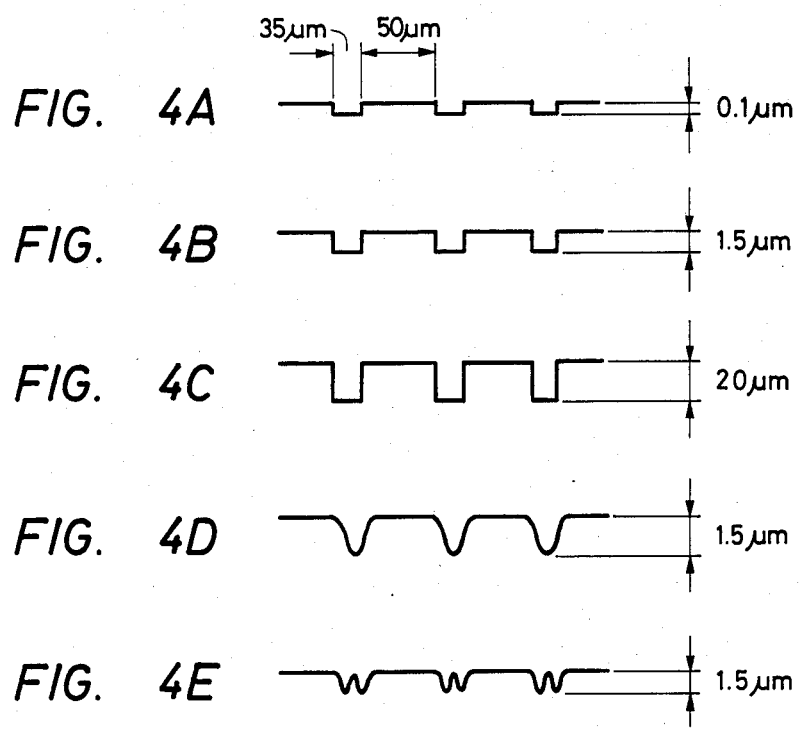
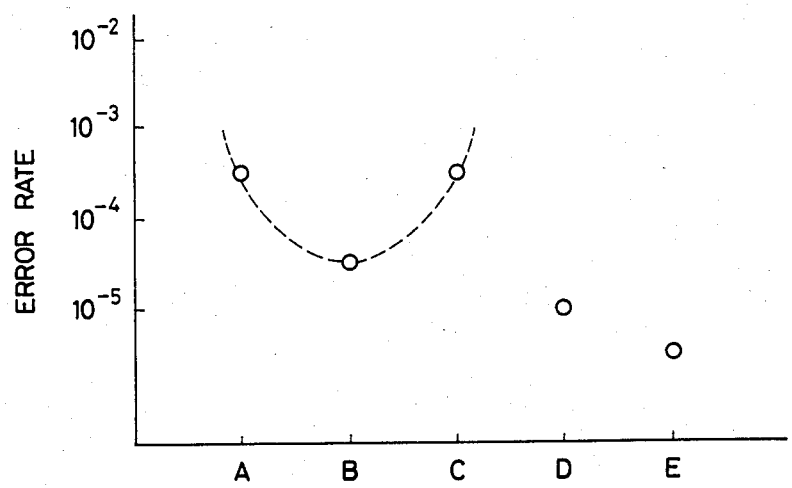

MULTICHANNEL MAGNETIC HEAD

BACKGROUND OF THE INVENTION

The present invention relates to a magnetic head, and more particularly, to a multichannel magnetic head having good contact characteristics with a magnetic tape.

Heretofore, magnetic heads for performing recording and reproducing on a magnetic tape have most commonly employed a polished planar surface in order to maintain continuous contact with a running magnetic tape.

A tape recorder with a multichannel magnetic head in which recording/reproducing can be simultaneously performed in plural channels on a magnetic tape has recently become available. Since this multichannel magnetic head performs recording/reproducing in multiple channels on a magnetic tape of an ordinary width, there is a disadvantage that the width of each recording track is very narrow. For example, when recording/reproducing is performed on eight tracks on a half width of a 3.8 mm tape commonly used in compact cassettes, the recording track pitch per channel is only about 200 microns. With such a narrow track width, the recording/reproducing output can easily be reduced by the presence of even a minute amount of dust or other contaminant deposited on the surface of the head. Also, with such a narrow recording track pitch, even very slight waving (wow or flutter) of the tape makes it impossible for the head to trace the tracks well. This often causes a reduction in reproducing output. Particularly, as the recording density is made higher and as the magnetic recording tape is made thinner, such a reduction in output and the loss of tracking accuracy become more acute.

SUMMARY OF THE INVENTION

An object of the present invention is therefore to solve the above-discussed problems associated with the conventional multichannel magnetic head.

Another object of this invention is to provide a multichannel magnetic head for which good contact with the magnetic tape is assured, and there is little influence by the presence of dust or the like.

The foregoing objects of the present invention are attained by a multichannel magnetic head for simultaneously performing recording/reproducing on multiple tracks on a magnetic tape in which a plurality of parallel grooves, inclined with respect to the direction of running of the magnetic tape, are provided at least in a tape-contact surface of the head at a tape-entrance side thereof.

Other features and advantages of the present invention will be apparent from the following description taken in conjunction with accompanying drawings.

BRIEF DESCRIPTION OF THE DRAWINGS

FIGS. 4A through 4E are diagrams showing shapes of different grooves which can be used with a magnetic head according to the invention;

FIG. 5 is a graph showing measured results of an error rate occurring with a magnetic head of the invention;

DESCRIPTION OF THE PREFERRED EMBODIMENTS

Figure 1:
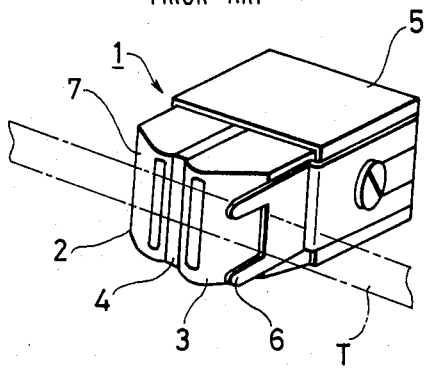
FIG. 1 is a perspective view of a multichannel magnetic head.

Referring now to the drawings, a preferred embodiment of the present invention will now be described hereunder.

FIG. 1 is a schematic view of a combination-type multichannel magnetic head constituted generally in the same manner as the conventional one. In the combination type magnetic head 1, a reproducing head 2 and a recording head 3 are housed in a case 5 together with a shield plate 4. Each of the heads 2 and 3 has a surface which is to be in contact with a magnetic surface of a tape T and which is shaped substantially in the form of an arc projecting along the running direction of the tape to thus provide good sliding characteristics with respect to the tape T. A restriction plate 6 is provided on a side surface of the casing 5 for holding the tape T in a predetermined position to thereby prevent waving of the tape T.

Figure 2A:
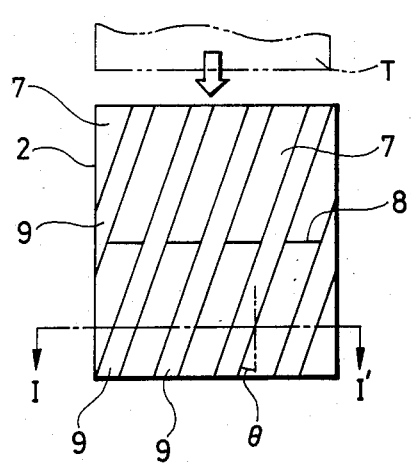
FIGS. 2A, 2B and 2C are diagrams used for explaining the construction and operation of a reproducing head according to the invention.
Figure 2B:
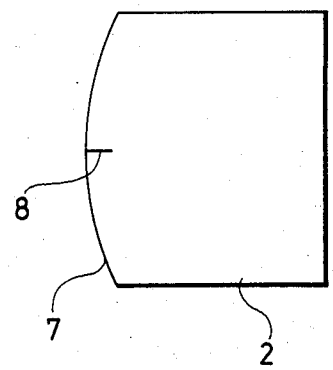
Figure 2C:
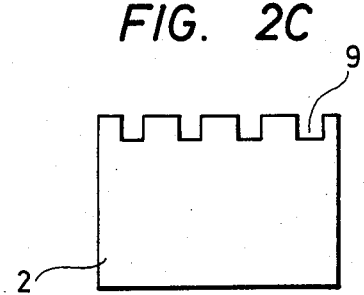

FIGS. 2A, 2B and 2C show the reproducing head 2 by way of example. FIG. 2A is a plan view, FIG. 2B is a side view, and FIG. 2C is a sectional view taken along a line I—I' in FIG. 2A.

The reproducing head 2 has a surface 7 which contacts a magnetic surface of the tape, and head gaps 8 are formed extending at the top portion of the surface 7 perpendicularly to the tape running direction, that is, the direction of an arrow in FIG. 2A. The head gaps 8 are formed at regular intervals and correspond in number to the number of reproducing tracks, thus forming individual reproducing heads for the multiple tracks.

The reproducing head 2 has a plurality of mutually parallel grooves 9 extending over the entirety of the surface 7. Each of the grooves 9 has a predetermined angle $\theta$ of inclination with respect to the tape running direction, and each groove is formed between adjacent ones of the head gaps 8. The grooves 9 are formed with a pitch substantially coincident with the recording track pitch.

The head gaps 8 are made of a high permeability soft magnetic material, a magnetic resistance element (MR), or the like. For example, permalloy, ferrite, sendust, amorphous material, or the like can be employed.

As the material forming the surface 7, which is to be in contact with the magnetic surface of the tape T, except the portion where the head gaps 8 are formed, a ceramic material of a high machinability, for example, "MACOR" (trademark of Corning Glass Works Corporation) or the like may be employed.

To test the effects of the invention, a magnetic tape T was caused to run on a reproducing head 2 constituted in the manner described above, and the amount of waving of the magnetic tape T was measured for different values of the inclination angle $\theta$ within a range of 0° to 60° (0° corresponds the case where the grooves 9 are not formed). The results attained are shown in FIG. 3.

The tape used was of the metal-powder-coating type, 3.8 mm in width, and having a coercive force of 1400 Hc. A transport speed of 47.6 mm/sec was employed.

Figure 3:
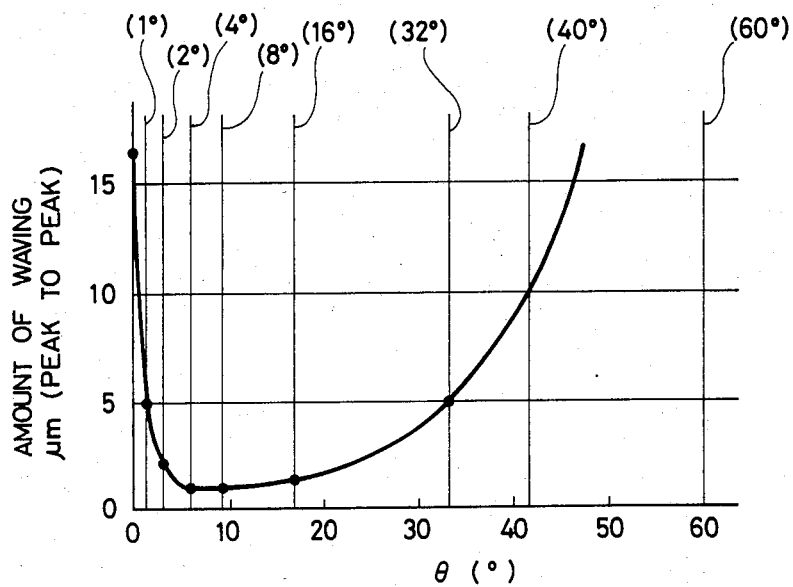
FIG. 3 is a graph showing the results of measurements of the amount of waving of a magnetic tape recording/reproducing occurring with a magnetic head according to the invention.

As is apparent from FIG. 3, the amount of waving had a peak value of about 5 microns (peak-to-peak) for the range of 1° to 30°. This shows that the restriction effect provided by the restriction plate 6 was sufficient. The results of the measurement show that waving is reduced in the case where the grooves 9 are formed at an inclination angle $\theta$ within the above-mentioned range. The above results show clearly that angles outside this range result in significantly increased amounts of waving.

Next, the cross-sectional shape of the grooves 9 was varied among the shapes shown in FIGS. 4A to 4E for a fixed inclination angle of $\theta = 8°$. The recording wavelength was $\lambda = 0.8$ micron. The error rate was measured, and the results are shown in FIG. 5. In FIG. 5, A indicates the groove configuration of FIG. 4A, B the configuration of FIG. 4B, etc. As apparent from FIG. 5, in the case of U-shaped grooves, the error rate generally increases as the groove depth varies from 1.5 micron. It was found that it is desirable to select the depth of the grooves within a range of 0.1 to 20 microns. When only the shape of the grooves 9 was varied without changing the depth, a desirable result was obtained in the case where the grooves were shaped as shown in FIGS. 4D and 4E. However, the U shape of FIGS. 4A to 4C is preferable in view of ease of machining.

Figure 6:
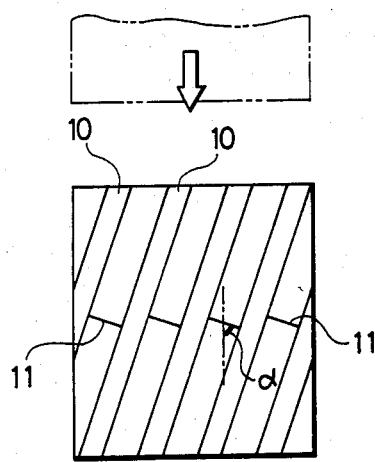
FIG. 6 is a plan view of an alternative embodiment of a magnetic head according to the invention.
Figure 7:
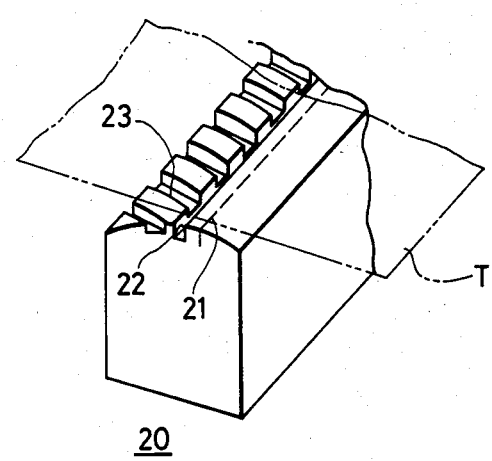
FIG. 7 is a partial perspective view of another alternative embodiment of a magnetic head according to the invention.

FIGS. 6 and 7 show modifications of the above-described embodiments. In FIG. 6, grooves 10 are provided at an inclination angle $\theta$ as in the case of the embodiment of FIG. 2, and the inclination angle $\theta$ is suitably selected with the range (from 1° to 30°) as described above. Head gaps 11 are established perpendicularly to the grooves 10 and inclined at a predetermined angle $\alpha$ with respect to the tape running direction. By forming the head gaps 11 in the manner described above, it is possible to reduce the gap length and thus increase the number of channels. In the case where the head gaps 11 are formed in accordance with this modification, the recording head (not shown) is required to be constructed in the same way so as not to produce an azimuthal error.

In FIG. 7, the reproducing head 20 is disposed perpendicularly to the tape running direction and is formed with a longitudinal groove 22 extending along the head gaps 21, formed in the surface of thereof at the tape-entrance side with the head gaps 21 as a boundary. Moreover, grooves 23 communicated with the longitudinal groove 22 are provided at the same inclination angle $\theta$ indicated in FIG. 2. The inclination angle $\theta$ is within the preferred range (1° to 30°) as described above. Essentially the same effects are obtained with this modification.

As discussed above, according to the present invention, it is possible to prevent dust deposited on the tape-contact surface of a magnetic head from flowing downstream of the tape to enter the head gap areas by forming inclined grooves on the tape-contact surfaces. The magnetic head thus provides good contact characteristics with the magnetic tape. Moreover, the amount of waving is significantly reduced since the magnetic tape is given a bias force in one direction due to the inclination of the grooves. Besides reducing the amount of waving of the tape, the error rate in the output is reduced.

We claim:

1. A multichannel magnetic head for simultaneously performing recording/reproducing on multiple tracks on a magnetic tape and having a tape-contact surface and a plurality or recording/reproducing gaps located on said surface, the improvement wherein a plurality of parallel grooves, inclined with respect to a direction of running of said magnetic tape, are provided at least on said tape-contact surface of said head at a tape-entrance side thereof.

2. The multichannel magnetic head according to claim 1, wherein an angle of inclination of said grooves in within a range of 1 to 30 degrees with respect to a tape running direction.

3. The multichannel magnetic head according to claim 1, wherein a depth of said grooves in within a range from 0.1 to 20 microns.

4. The multichannel magnetic head according to claim 1, wherein a pitch of said grooves substantially coincides with a pitch of said tracks.

5. The multichannel magnetic head according to claim 1, wherein said grooves are rectangular in cross section.

6. The multichannel magnetic head according to claim 1, wherein said grooves have a rounded bottom portion.

7. The multichannel magnetic head according to claim 1, wherein said grooves have a wavy bottom having a plurality of undulations.

8. The multichannel magnetic head according to claim 1, wherein said magnetic gaps extend orthogonal to a longitudinal direction of said grooves.

9. The multichannel magnetic head according to claim 1, wherein a longitudinal groove is formed on said tape-contact surface extending along said head gaps perpendicular to said tape running direction, said first-mentioned grooves communicating with said longitudinal groove.

* * * * *